Aug. 8, 1961  R. J. ZEITLER  2,995,321
FLUID TRANSFER SYSTEMS
Filed July 15, 1958  2 Sheets-Sheet 1
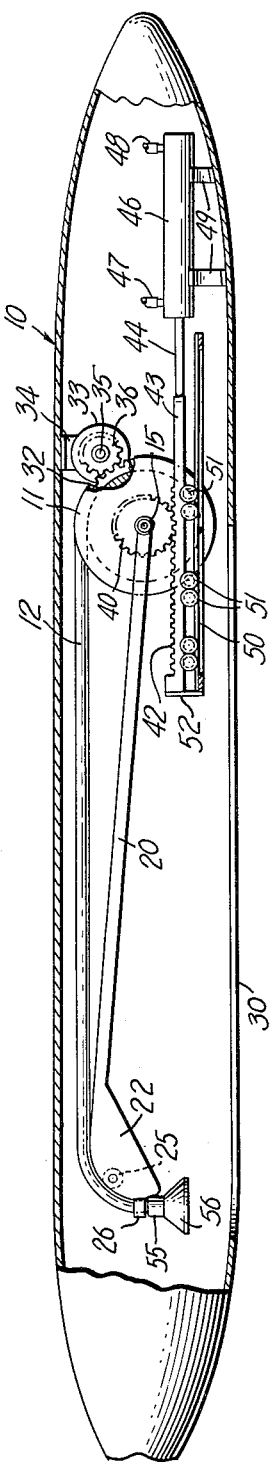
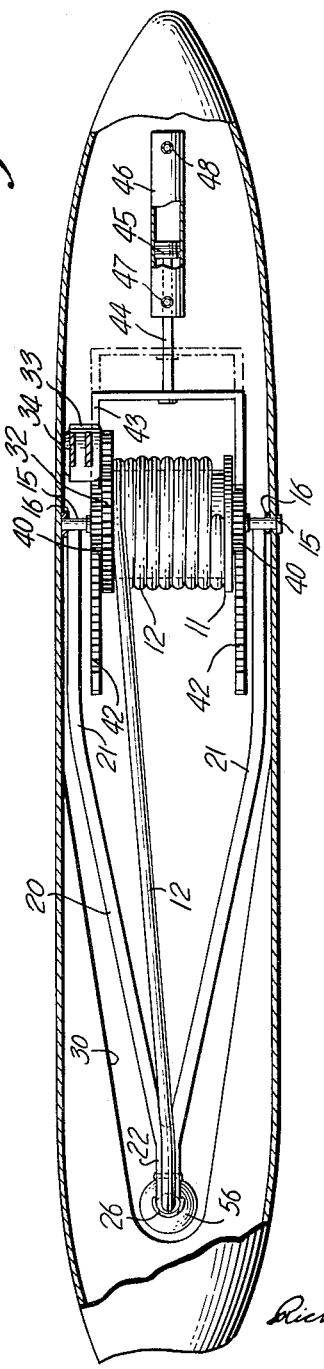
INVENTOR
Richard J. Zeitler
BY Watson, Cole, Grindle & Watson
ATTORNEYS Aug. 8, 1961  R. J. ZEITLER  2,995,321
FLUID TRANSFER SYSTEMS Filed July 15, 1958  2 Sheets-Sheet 2

INVENTOR
Richard J. Zeitler
BY Watson, Cole, Grindle & Watson
ATTORNEYS

United States Patent Office 2,995,321
Patented Aug. 8, 1961

2,995,321
FLUID TRANSFER SYSTEMS
Richard J. Zeitler, Danbury, Conn., assignor to Flight Refueling Incorporated, Baltimore, Md., a corporation of Delaware
Filed July 15, 1958, Ser. No. 748,700
5 Claims. (Cl. 244—135)

This invention relates to the transfer of fluid from one vehicle to another and more particularly to the refueling of aircraft in flight.

The general object of the invention is the provision of a novel and improved method and means for effectively and safely accomplishing the transfer of quantities of fluid from one vehicle to another through a flexible hose, and without the use of extraneous means such as spring devices for keeping the host taut during the process.

In the refueling of aircraft in flight, especially by the use of the probe and drogue methods and equipment developed by the applicant's assignee company, a hose or flexible conduit, carrying a fluid coupling and a drogue at its free end, is payed out from the leading aircraft, which is usually the tanker, and the following aircraft maneuvers to take station so that its probe, carrying a mating coupling at its end, may be gently brought into contact with the host coupling. In making interlocking engagement for transfer of fuel, and also during certain unavoidable deviations in relative position during the refueling operation, the trailed coupling and outer terminal portions of the hose will be subjected to compression stresses which will overcome the drag supplied by the drogue element, and the hose will tend to go slack.

In order to compensate for this slack in the hose, prior installations have included a variety of spring devices usually associated with the hose reel or with its driving or supporting means.

It is an object of the present invention to provide a novel and improved hose mounting device by which the hose may be projected properly from the leading aircraft into the airstream for the efficient and safe contact and operative engagement by the cooperating mating parts carried by the following aircraft.

The invention in its preferred embodiments contemplates the provision of a strut or boom which is pivotally supported at one end from a portion of the leading aircraft preferably adjacent the hose reel or drum, and is provided at its outer end with running guide means for the hose such as a sheave or the like.

Generally, for the purposes of the refueling operation, the strut is lowered to approximately vertical position, and that portion of the hose which extends between the outer end of the strut and the inner pivoted end thereof is also substantially vertically disposed and subjected to aerodynamic drag in the airstream. The relationship of the hose and boom or strut is such that the latter does not obstruct the free fore-and-aft flexing or bowing of the length of the hose which substantially parallels the strut.

This novel concept of the responsive loop system of refueling of aircraft involves the automatic take-up of the trailing hose by means of such aerodynamic drag on the substantially vertical segment of the hose. When the receiver aircraft makes contact with the drogue-and-coupling at the free end of the hose, and advances toward the depending strut, the terminal portion of the hose is put into compression, the normal preponderating drag of the drogue-and-coupling member being overcome. However, the hose between the running sheave and the coupling does not go slack nor tend to whip, since the aerodynamic drag on the hose portion which extends between the sheave and the base of the strut provides a tensioning force in this portion of the hose and, taking up any potential slack from the horizontal trailing portion, forms a deepened or more pronounced catenary loop in the vertical intermediate segment of the hose.

Inasmuch as during variations in air speed, the drogue drag is always somewhat greater than the drag of the vertical segment of the hose, the take-up function is automatically adjusted throughout a wide range of air speeds.

Furthermore, the extent or depth of the catenary bend in the looped hose segment provides a visual indication to the receiver pilot of the forward limitation of the operating envelope.

It will be seen that once the projectable equipment is extended to the contact position the entire function of the device is automatic without the necessity for other operating mechanism, drive moors, or actuating pistons.

Other objects and features of novelty will be apparent from the following specification when read in connection with the accompanying drawings in which certain embodiments of the invention are illustrated by way of example.

In the drawings:

FIGURE 1 is a view in side elevation of a refueling pod adapted to be carried by a leading aircraft, the major portion of the pod being broken away to show in somewhat diagrammatic form the essentials of the hose handling mechanism;

FIGURE 2 is a top plan view of the pod broken away to show the interior arrangement;

Figure 3:
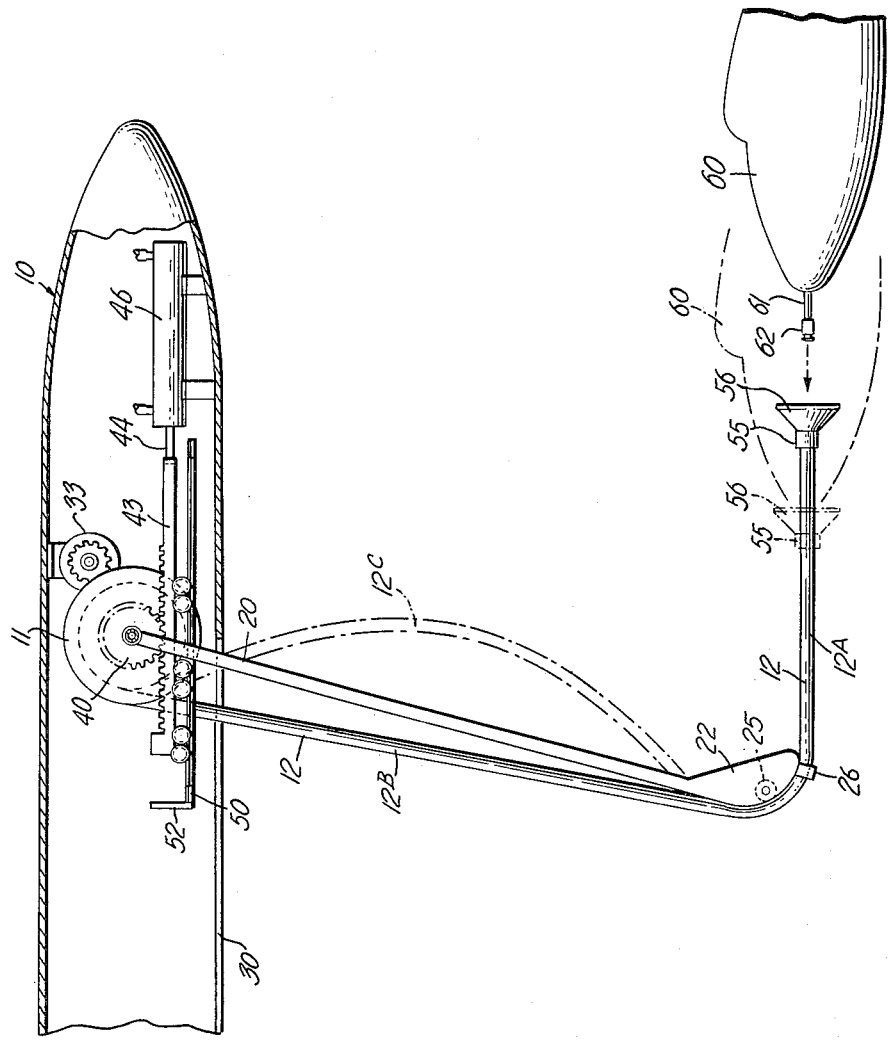
Figure 4:
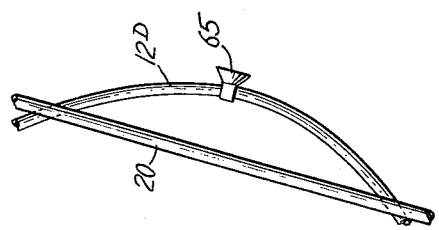

FIGURE 3 is a view similar to FIGURE 1 but showing the hose extended for coupling to a following aircraft, which is suggested in fragmentary and purely diagrammatic style and on a much smaller scale than the principal hose handling portions of the figure; and FIGURE 4 is a fragmentary view in side elevation of the vertical loop segment of the hose with an optionally usable drag attachment applied thereto.

Although within the broad aspects of the present invention, the fluid transfer means may be enclosed within or supported by any suitable portion of the leading aircraft or other vehicle, the device is illustrated in the drawing as being housed within a pod 10 which may be embodied in or supported from such vehicle by any suitable means.

Trunnioned within the pod 10 is the hose reel 11 upon which the convolutions of the hose 12 are wound. In the quite diagrammatic showing afforded by the drawings, the hose reel 11 is supported for rotation upon an axis which is provided by the axle 15 which is adapted to rock in bearings diagrammatically suggested at 16.

The rockable shaft member 15 serves as a pivotal support for the boom or strut 20 which is of forked construction having legs 21, the inboard ends of which are fixed to the trunnion shaft 15 and the outboard ends of which are conjoined and shaped to provide a curved and grooved guide block 22 for the hose 12. As an added anti-friction device a sheave 25 is mounted for rotation in the block 22 and also grooved for the accommodation of the hose. A retaining sleeve or collar 26 may also be carried by the block 22 for preventing inadvertent detachment of the hose from the strut.

An opening 30 is provided in the bottom wall of the container or pod 10 and is shaped to accommodate the strut 20 and the hose 12 during swinging movement of these parts to and from extended operative position. The parts are shown in FIGURES 1 and 2, of course, in their retracted or stowed position, and when thus received within the pod 10 the opening 30 may be closed by any suitable door or closure device (not shown).

In the illustrated embodiment of the invention, one of the head flanges of the drum 11 is provided with gear teeth as at 32 and the drum is adapted to be driven by means of the electric motor 33 which is supported from the pod 10 as by means of the bracket 34. The shaft 35 of the motor carries a pinion 36 which meshes with the drum or reel gear 32. The motor 33 is reversible and, depending upon its direction of rotation, serves to rotate the drum or reel 11 in directions to wind up or pay out the hose 12 as desired.

The reel 11 is mounted to rotate freely upon the trunnion shaft 15 and fixed to the shaft 15 upon either side of the reel 11 are the gears 40. These gears mesh respectively with the racks 42 which are carried by the frame 43, the frame being fixed to a piston rod 44 which is in turn fixed to the piston 45 positioned to move within the cylinder 46 which comprises a reciprocating drive motor for positioning the hose extending strut. Motive fluid may be introduced and exhausted from the fluid connections 47 and 48 for moving the racks in alternate opposite directions. The motor cylinder 46 may be supported within the pod by means of the brackets 49.

The racks 42 are supported for horizontal reciprocation upon a guide frame 50, anti-friction wheels or rollers 51 being provided for facilitating the movement of the racks and a stop plate 52 fixed at the forward end of the frame 50 for limiting the forward movement of the racks which swing the strut.

Thus it will be seen that upon retraction of the piston 45 in the motor cylinder 46 the racks 42 will be drawn rearwardly and the gears 40 carried by the trunnion 50 of the strut 20 will be rotated in a counterclockwise direction as viewed in FIGURES 1 and 3, thus swinging the strut 20 from the position of repose shown in FIGURE 1 downwardly and rearwardly to a position such as indicated in FIGURE 3 of the drawings in which the strut 20 and that portion of the hose 12 which parallels it are positioned at an angle to the surrounding airstream. The exact angle of extension of the strut 20 is not critical so far as the present invention is concerned, and the angle of operative extension of the strut may vary from the position shown in FIGURE 3 within a rather wide extent.

After the strut 12 is extended, or during the extending operation, the reel 11 may be rotated by the energizing of the motor 33 in a direction to pay out the hose 12. The outboard end of the hose 12 is provided with the usual combined drogue-and-coupling device which includes the coupling 55 and the funnel-shaped drogue 56. When introduced into the airstream the drogue 56 develops sufficient aerodynamic drag to cause the trailing terminal portion 12A of the hose to stream aft at an appropriate angle for coupling contact by a receiver aircraft, and during the free trailing of the hose the portion 12B of the hose, which extends between the end block 22 of the strut 20 and the inboard hose supported parts represented by the reel 11, lies in an approximately rectilinear position as shown in solid lines in FIGURE 3.

After the hose has been extended to the point where coupling contact by the receiver aircraft is feasible, the pilot of this aircraft maneuvers it to approach coupling station. The receiver craft indicated at 60 in FIGURE 3 is provided with a probe 61 carrying a mating coupling 62, which is to be brought into contact with the coupling 55 through the guidance of the funnel-shaped probe element 56.

The pilot of the following aircraft 60 continues to advance his aircraft until operative engagement is established between the coupling parts 55 and 62. During the maneuvering attendant upon securely interlocking the coupling parts, the trailed drogue and coupling 55, 56 is nudged forwardly and as a consequence the trailing terminal portion 12A of the hose is put under some degree of compression, the normal tension furnished by the drag of the drogue 56 being overcome by the advancing of the probe. This would normally throw an inconvenient or dangerous amount of slack in the trailed portion 12A in the hose and this slack would have to be taken up by some sort of counterbalancing means, usually afforded by spring devices associated with the strut or with the hose reel. However, by the unique provisions of the present invention, the aerodynamic drag of the intermediate portion 12B of the hose, which extends across the direction of flow of the airstream, causes a catenary loop to be formed in this intermediate portion as indicated at 12C, thus effectively taking up the slack developed by the displacement of the drogue and coupling element 55, 56 from the position indicated in the solid lines in FIGURE 3 to the position shown in dotted lines.

Furthermore, during the refueling process any inadvertent relative movements between the two aircraft which might give rise to slackening and extension of the trailing portion of the hose would be compensated for and accommodated by the responsive loop 12C maintained in the intermediate portion of the hose between the end of the strut 20 and the inboard supporting means for the hose.

Upon breakaway after completion of the refueling process, the trailing portion 12A of the hose will again be extended in an aft direction, the catenary loop 12C in the intermediate portion will be released, and this portion of the hose will resume its approximate position 12B, and the preponderance of drag afforded by the drogue 56 will maintain the parts in the solid line position shown in FIGURE 3, until rotation of the reel 11, or swinging of the strut 20 causes the parts to be restored to their stowed position as shown in FIGURE 1.

A slight modification of the present arrangement is suggested in FIGURE 4 of the drawings where the catenary loop portion of the hose indicated at 12D is provided with a supplemental drogue member 65 which increases to a desired degree the aerodynamic drag of this loop. In any event, however, the combined drag of the loop 12D and the drogue 65 is less than that of the terminal portion 12A of the hose together with its drogue-and-coupling element 55, 56.

It will be obvious to one skilled in the art that the same principles of operation may be taken advantage of if the hose extending strut were to be swung outwardly from the pod in any other radial direction than the vertical downward direction illustrated.

Various other changes and modifications may be made in the embodiments of the invention illustrated and described herein without departing from the scope of the invention as determined by the subjoined claims.

Having thus described the invention, what is claimed as new and desired to be secured by Letters Patent is:

1. In a system for effecting the transfer of fluid material from one rapidly moving vehicle to another, as for use in refueling aircraft in flight, in combination: a hose carried by a leading vehicle and adapted to be connected with a fluid receptacle therein; a device for supporting the hose in position for trailing the terminal portion thereof in the airstream for contact by the other vehicle, said device extending from said leading vehicle into the surrounding airstream and at an angle thereto and including means for sustaining intermediate portions of the hose at at least two points spaced apart transversely of the airstream; the outboard one of the two last named means serving to sustain the hose in running guiding contact while freeing a loop of said hose between said spaced sustaining points for subjection to the aerodynamic drag of the airstream; the spacing of the two last named means being sufficiently great so that any slack occurring in the trailed terminal portion of the hose, as for example due to the imposing of forwardly directed compression force on said terminal portion during fluid transferring contact, is automatically taken up by the lengthening of the intermediate loop due to the drag force of the loop, said device between said two spaced points of sustention being displaced out of alignment in the fore-and-aft direction so that no impediment is offered to either the rearward lengthening of the intermediate loop under drag or to the direct impact of the force of the airstream on said loop.

2. In a system for effecting the transfer of fluid material from one rapidly moving vehicle to another, as for use in refueling aircraft in flight, in combination: a hose carried by a leading vehicle and adapted to be connected with a fluid receptacle therein; a device for supporting the hose in position for trailing the terminal portion of said hose in the airstream for contact by the other vehicle; a drogue member carried by the trailed terminal portion of said hose, which drogue member is of sufficient drag to normally maintain the proper trailing angle of the hose for properly effecting fluid transfer contact; said hose supporting device extending from said leading vehicle into the surrounding airstream and at an angle thereto, and including means for sustaining intermediate portions of the hose at at least two points spaced apart transversely of the airstream; the outboard one of the two last named means serving to sustain the hose in running guiding contact while freeing a loop of said hose between said spaced sustaining points for subjection to the aerodynamic drag of the airstream; the spacing of the two last named means being sufficiently great so that any slack occurring in the trailed terminal portion of the hose, as for example due to the imposing of forwardly directed compression force on said terminal portion during fluid transferring contact, is automatically taken up by the lengthening of the intermediate loop due to the superior drag force of the loop when the normal drogue induced tension in the terminal portion of the hose is relieved, said device between said two spaced points of sustention being displaced out of alignment in the fore-and-aft direction so that no impediment is offered to either the rearward lengthening of the intermediate loop under drag or to the direct impact of the force of the airstream on said loop.

3. The combination set forth in claim 2 in which a supplemental drogue is secured to the intermediate loop portion of the hose to increase the drag of said loop portion.

4. The combination set forth in claim 2 in which said hose supporting device comprises a reel carried by said leading aircraft and a strut having its inboard end pivoted to the leading aircraft for projection therefrom at the desired angle, and its outboard end carrying a sheave device about which an intermediate portion of the hose can play as the automatic slack eliminating adjustment takes place, and about which the hose may run during paying-out or winding-in.

5. The combination as set forth in claim 4 in which the strut is forked from its outboard sheave supporting end inwardly to where its two legs are pivoted at respective ends of the axis of the reel, whereby the space between the legs of the strut affords free passage of the aerodynamic responsive loop.

References Cited in the file of this patent

UNITED STATES PATENTS

| | | |
|---|---|---|
| 2,388,013 | Rasor | Oct. 30, 1945 |
| 2,813,719 | Hopper | Nov. 19, 1957 |
| 2,879,017 | Smith | Mar. 24, 1959 |

OTHER REFERENCES

Aviation Week Magazine, Aug. 15, 1955, pages 53 and 55.

Aviation Week Magazine, July 8, 1957, page 34.